US011486835B2

(12) United States Patent
Alnefaie et al.

(10) Patent No.: US 11,486,835 B2
(45) Date of Patent: Nov. 1, 2022

(54) DRIFT AND MEASUREMENT TOOLS AND METHODS

(71) Applicant: SAUDI ARABIAN OIL COMPANY, Dhahran (SA)

(72) Inventors: Naif Alnefaie, Dammam (SA); Bader Alsayegh, Alkhobar (SA); Amer Alharty, Dammam (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 181 days.

(21) Appl. No.: 17/097,418

(22) Filed: Nov. 13, 2020

(65) Prior Publication Data

US 2022/0155241 A1    May 19, 2022

(51) Int. Cl.
*G01N 21/954*    (2006.01)

(52) U.S. Cl.
CPC ... *G01N 21/954* (2013.01); *G01N 2021/9544* (2013.01); *G01N 2201/06113* (2013.01)

(58) Field of Classification Search
CPC ..... G01B 11/02; G01B 11/12; G01B 11/2408; G01N 21/954
See application file for complete search history.

(56) References Cited

U.S. PATENT DOCUMENTS 9,304,204 B2 *   4/2016   Krauhausen ............ G01S 17/88
10,054,425 B2 *   8/2018   Moore ..................... G01B 11/12

FOREIGN PATENT DOCUMENTS

| CN | 102252626 B | 2/2013 |
| CN | 105484728 A | 4/2016 |
| CN | 110067553 A | 7/2019 |
| CN | 209910592 U | 1/2020 |

OTHER PUBLICATIONS

International Search Report and Written Opinion issued in Application No. PCT/US2021/059141, dated Mar. 7, 2022 (12 pages).
"Casing Drifts", Oilfield Connect, Oilfield Connect Pty Ltd., 2016, Date Accessed: Nov. 13, 2020, URL: <https://www.oilfieldconnect.com.au/home/casing-tubing-accessories/casing-drifts/> (4 pages).
"Laser Measurement Tools: Customized Sensors and Laser Sensor Expertise", Acuity, Schmitt Industries Inc., Date Accessed: Nov. 13, 2020, URL: <https://www.acuitylaser.com/laser-sensors/> (6 pages).

* cited by examiner

*Primary Examiner* — Rebecca C Bryant
(74) *Attorney, Agent, or Firm* — Osha Bergman Watanabe & Burton LLP

(57) ABSTRACT

A drifting and measurement tool is disclosed. The tool includes a first portion configured to mount on a first end of a tubular segment, and a second portion configured to mount on a second end of the tubular segment. The first portion has a rotatable component configured to rotate about a longitudinal axis of the tubular segment. The rotatable component includes a laser device configured to emit light toward the second portion and receive reflected light.

20 Claims, 4 Drawing Sheets

DRIFT AND MEASUREMENT TOOLS AND METHODS

BACKGROUND OF INVENTION

BACKGROUND ART

Pipes, casing, and other tubular components are used in a variety of applications. Within the oilfield industry, tubular components, which may be referred to as "tubulars," are used as casings for lining downhole wells, pipes for constructing pipelines, or conduits for moving fluid through drill strings. In each of these use cases, many tubular segments may be connected together to construct extended lengths of pipe. Dimensional accuracy of each tubular segment is important to ensure adequate clearance for equipment, for proper sealing between segments, and/or for accurate fluid flow and pressure calculations.

SUMMARY OF INVENTION

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments disclosed herein relate to a drifting and measurement tool comprising a first portion configured to mount on a first end of a tubular segment, a second portion configured to mount on a second end of the tubular segment, wherein the first portion comprises a rotatable component configured to rotate about a longitudinal axis of the tubular segment, and wherein the rotatable component comprises a laser device configured to emit light toward the second portion and receive reflected light.

In general, in one aspect, embodiments disclosed herein relate to a method of inspecting a tubular segment. The method involves assembling a first portion of a drift and measurement tool onto a first end of a tubular segment, assembling a second portion of the drift and measurement tool onto a second end of the tubular segment, activating a laser device on the first portion, wherein the laser device emits light toward the second portion and wherein the laser device receives reflected light, rotating at least part of the first portion of the tool to revolve the laser device about a longitudinal axis of the tubular segment, and obtaining distance measurements at a plurality of locations, wherein the distance measurements correspond to a distance between the laser device and an intervening surface.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1A:
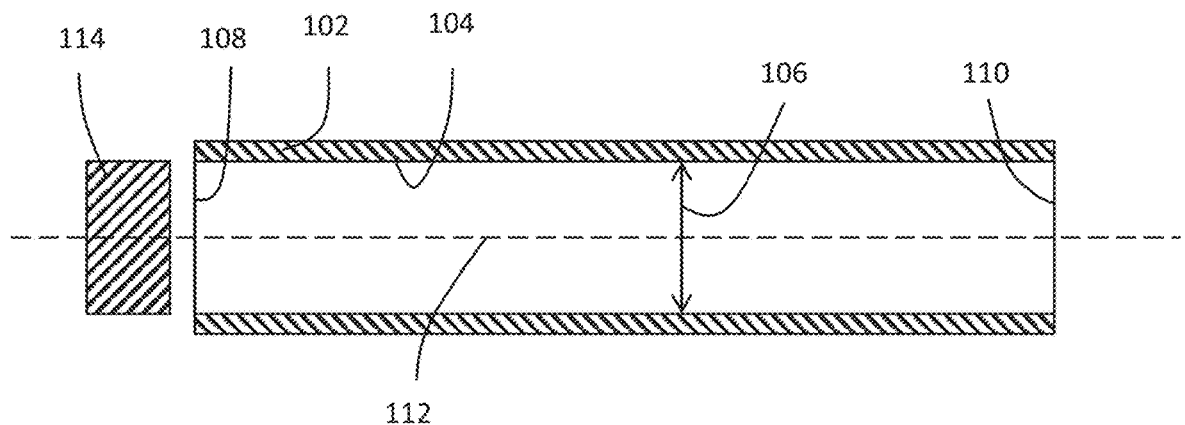
FIGS. 1A-1C are cross-sectional views of a tubular segment illustrating a drifting process.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, well known features or processes associated with hydrocarbon production systems have not been shown or described in detail to avoid unnecessarily obscuring descriptions of the implementations and embodiments. For the sake of continuity, and in the interest of conciseness, same or similar reference characters may be used for same or similar objects in multiple figures.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

When assembling a length of pipe made up of several tubular segments, each segment must be connected to the adjacent segments such that a seal is created at the connection. Dimensions of the connection portions of each segment must fall within a predetermined tolerance in order to achieve a seal that can withstand fluid pressure without leaking. Additionally, each segment must be structurally sound along its entire length in order to withstand pressures that may be applied to the segment either internally by the contents of the tubular or externally by a surrounding environment. Any tubular having a collapsed, bowed, bent, or otherwise deformed portion along its length may compromise the structural integrity of the entire assembly or may cause other problems associated with incorrect dimensions, such as interference with other componentry, flow rate or pressure deviations, etc.

To ensure that dimensions for each tubular segment are within a predetermined tolerance, each tubular segment may be inspected using a process called "drifting" prior to being included in a tubular assembly. In some applications, tubular assemblies may stretch for thousands of feet with each tubular segment measuring, for example, on the order of tens of feet in length. Thus, it is not uncommon for tubular assemblies to include over 100 tubular segments, each requiring inspection before being connected to the tubular assembly.

Figure 1B:
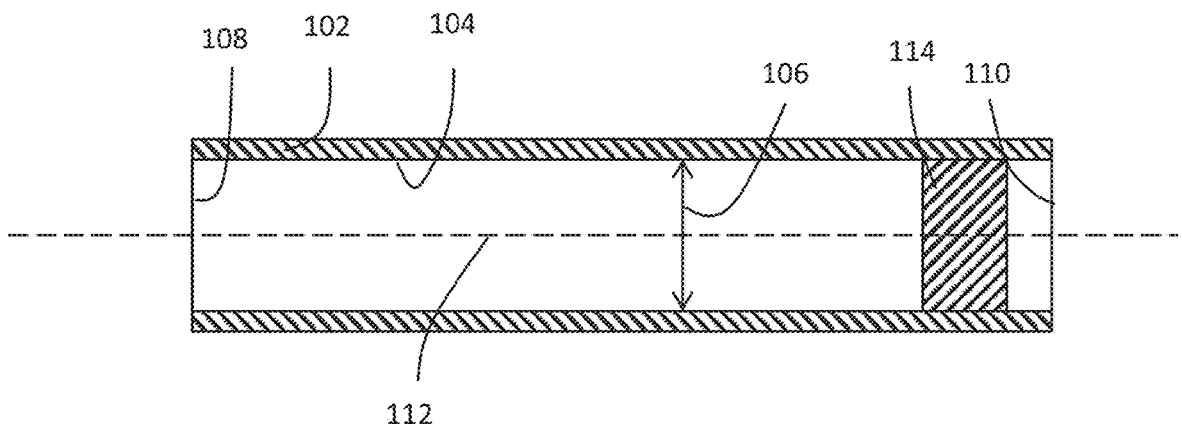
Figure 1C:
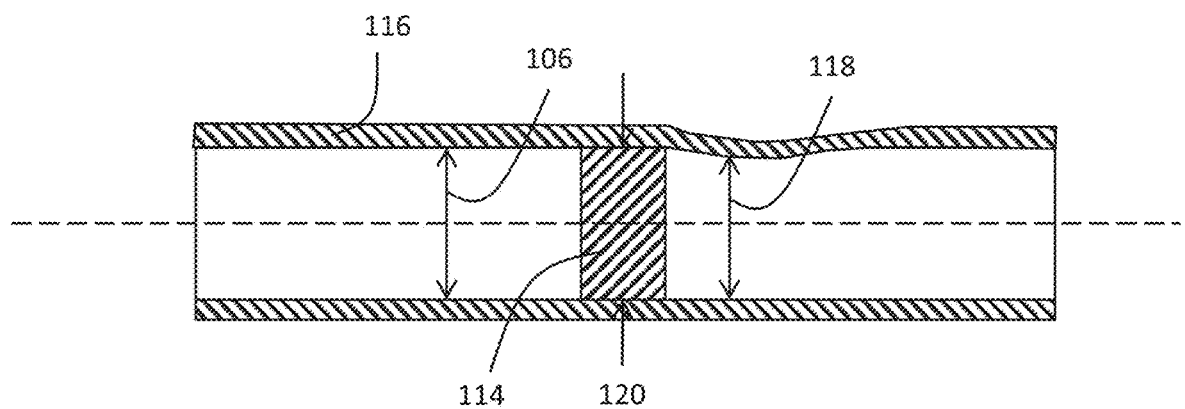

A drifting technique for confirming that a full length of a tubular segment has at least a minimum internal diameter dimension is illustrated in FIGS. 1A-1C. Tubular segment 102 includes a bore 104 having an inner diameter 106. The bore 104 extends from a first opening 108 to a second opening 110 opposite the first opening. The tubular segment 102 includes a longitudinal axis 112 extending through the center of the bore 104 at substantially the midline of the tubular segment.

Referring to FIGS. 1A and 1B, the drifting process verifies roundness of the bore 104 and verifies minimum internal diameter of a tubular segment. The drifting process currently includes passing a cylinder 114 of known roundness and diameter, commonly referred to as a "drift," through the inner bore 104. If the inner bore has sufficient roundness and diameter to allow the drift 114 through the tubular segment from the first opening 108 to the second opening 110, the tubular segment passes inspection and may be used as a component in the tubular assembly.

However, referring to FIG. 1C, it is possible for the diameter of bore 104 to be too small to pass the drift through the tubular segment 102. For example, tubular segment 116 includes a compromised section having a diameter 118 that is smaller than the outer diameter 120 of the drift 114. Interference between the compromised section of the tubular segment 102 and the drift 114 prevents the drift from passing all the way through the tubular segment. In some embodiments, the compromised section may be a section of the tubular that has insufficient roundness, poor manufacturing dimensional tolerance, or other deformations or defects. An operator performing the drifting process will understand that when a drift is unable to pass from the first opening to the second opening, the tubular segment has a defect and should not be used in the larger tubular assembly.

The process described above is time consuming, costly, and requires significant manpower. Furthermore, the process provides only pass/fail information about the tubular segment being evaluated. The current process also lacks accuracy. Drifts are reused multiple times and can experience wear that decreases the outside diameter dimension. The outside diameter dimension is the reference for determining a pass or fail inspection for each tubular segment. Thus, using a worn drift may provide indicate that a tubular segment passes inspection for minimum acceptable internal diameter, when in fact, the tubular may not actually meet such minimum diameter requirements over its full length.

A new tool for measuring roundness of the bore within a tubular segment is described below. More specifically, the tool is an automated equipment that can drift and measure the casing and tubulars simultaneously and instantaneously with a high accuracy and precision by using laser technology. The tool described herein provides drifting information (i.e., verifies that a tubular segment is sufficiently round and has at least a minimum desired internal diameter), and provides information about the length of the tubular segment. If the tool determines that the tubular segment is not round or has at least one location where the internal diameter is less than the minimum acceptable internal diameter, the tool can provide information about the location of the defect along the length and circumference of the tubular segment. The tool collects drifting and measurement data in less time and with more accuracy than the previous drifting processes. For example, the tool described herein may reduce the drifting time by approximately 80% compared to the process described in FIGS. 1A-1C.

Figure 2A:
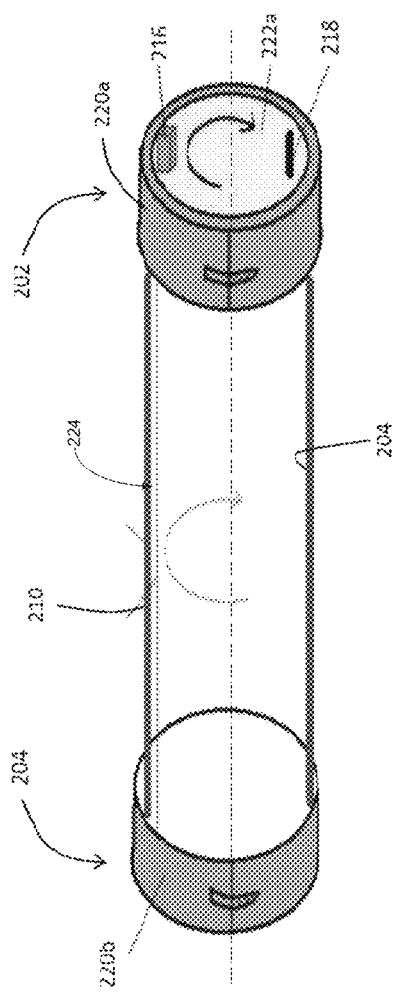
FIG. 2A and 2B show a perspective view and a cross-sectional view, respectively, of a drifting and measurement tool assembled on a tubular segment, in accordance with embodiments disclosed herein.
Figure 2B:
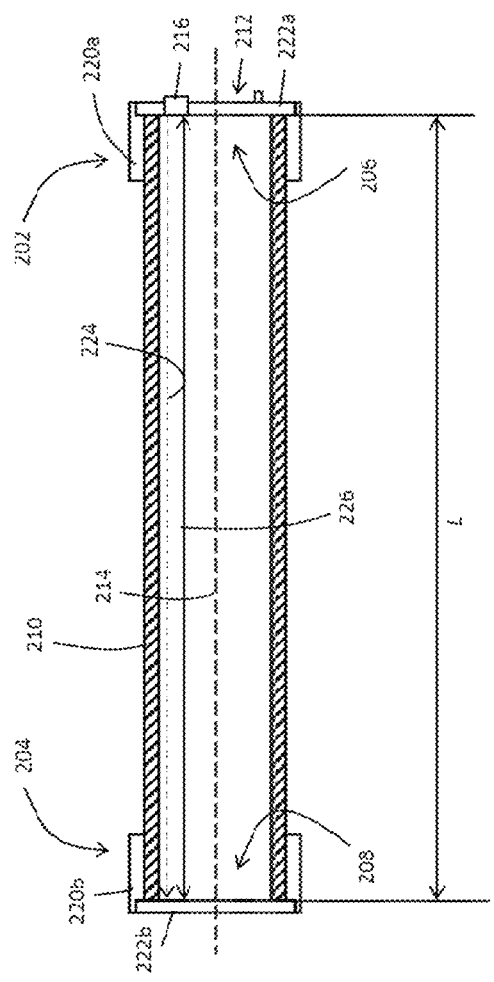

Referring to FIGS. 2A and 2B, perspective and cross-sectional views of one or more embodiments of a drifting and measurement tool are shown, respectively. Drifting and measurement tool includes a first portion 202 and a second portion 204. The first and second portions may be configured as first and second caps, each having a circumferential wall 220a, 220b and an end wall 222a, 222b. The first and second portions may fit securely over first and second ends 206, 208, respectively, of a tubular segment 210 (also called casing) as shown. In some embodiments, the first and second portions may include threads or other selectively removable coupling mechanisms for securing the caps to the tubular segment prior to performing the drifting and measurement operation.

The end wall 220a of first portion 202 includes a rotatable component 212 configured to rotate with respect to the tubular segment. The rotatable component may be a substantially flat, circular plate configured to rotate about a longitudinal axis 214 of the tubular segment. In some embodiments, the end wall 222a is the rotatable component and may be configured to rotate with respect to the circumferential wall 220a of the first portion 202. An interior surface of the rotatable component 212 of first portion 202 and an interior surface of the second end wall 222b may be positioned flush with the first and second ends 206, 208 of the tubular segment 210 such that the interior surfaces are substantially coplanar with the first and second ends 206, 208. Furthermore, the interior surface of the rotatable component 212 and the interior surface of the second end wall 222b may be substantially parallel to each other and orthogonal to the longitudinal axis 214 of the tubular segment 210.

A laser device 216 is mounted to or integrally formed with the rotatable component 212 such that laser light/beam is emitted from and received by the laser device 216 at a location substantially coplanar with the first end 206 of tubular segment 210. The laser device 216 is configured to emit laser light 224 continuously or at an intermittent frequency toward the interior surface of the second end wall 222b disposed on the second end 208 of the tubular segment. Laser light 224 is reflected by the interior surface of the second end wall 222b and returns to the laser device 216 where it is detected. The laser device determines a distance 226 between the laser device at the first end 206 and the second end wall 222b at the second end 208 based on time-of-flight or pulse measurement principles. In other words, in accordance with one or more embodiments, the laser device 216 is used for length measurement and to drift various sizes of casing/tubing at the same time.

The position of the laser device 216 is selected based on the minimum acceptable internal diameter for the tubular segment. For example, if the minimum acceptable internal diameter of the tubular segment is 7 inches, the laser device 216 is positioned such that laser light is emitted from and received by the laser device at a radius 3.5 inches from the center of the rotatable component 212, which substantially corresponds to the intersection with the longitudinal axis 214. As the rotatable component is rotated a full revolution about the longitudinal axis 214, laser device 216 emits and receives laser light along the minimum acceptable diameter dimension. The laser device 216 measures the distance between the laser device 216 and the next intervening surface at a plurality of locations around the internal circumference of the tubular segment 210. The rotatable component 212 may include a handle 218 to facilitate rotating the rotatable component 212 in at least a full 360° revolution about the longitudinal axis 214.

If the tubular segment 210 does not have defects that impinge on the minimum acceptable diameter, the measured distance 226 at each measurement location during the full revolution of rotatable component 212 is substantially equal to the expected length L of the tubular segment 210. Thus, if all measurements from the laser device 216 are substantially equal to the expected length L, it can be quickly determined that the tubular segment is free from obstructing defects and passes inspection.

The expected length L of the tubular segment may be based on a manufacturing specification or may be based on information received from the tubular manufacturer. In some embodiments, the expected length may be based on commonly used standards. For example, casing tubular segments are typically 40 feet in length while drill pipe tubular segments are typically 30 feet in length.

Figure 3:
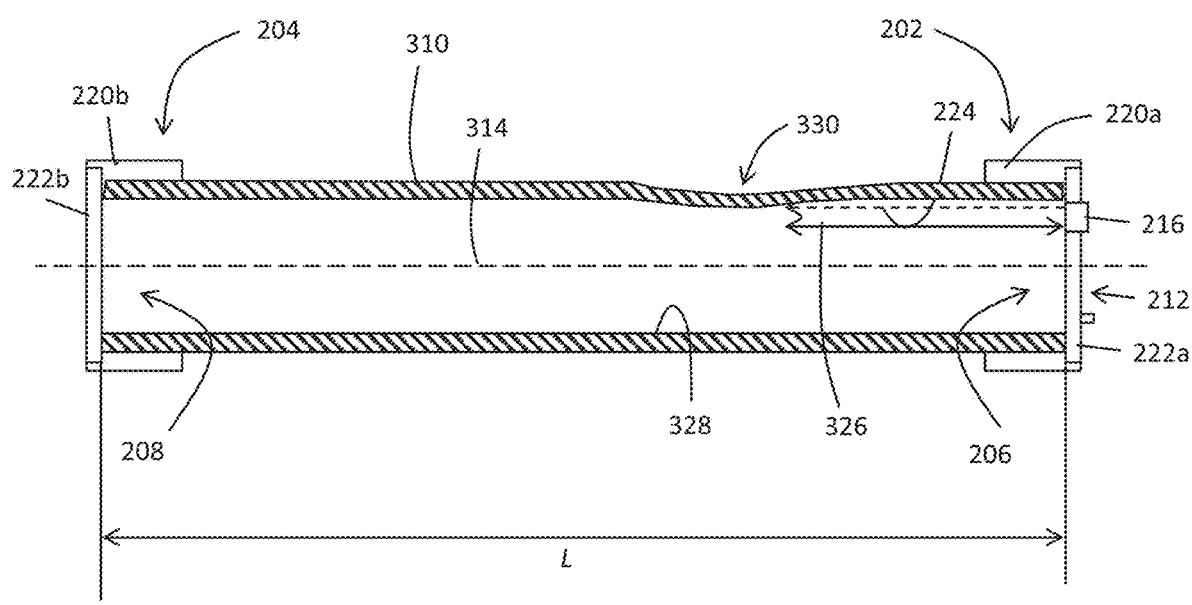
FIG. 3 shows a cross-sectional view of a drifting and measurement tool assembled on a tubular segment having a defect, in accordance with embodiments disclosed herein.

Referring to FIG. 3, the drifting and measurement tool is illustrated on a tubular segment 310 that includes a defect 330 protruding into a bore 328 of the tubular segment 310. As the rotatable component 212 is rotated about the longitudinal axis 314, laser light is 224 emitted toward the interior surface of the second end wall 222b. Distance measurement 326 between the laser device 216 and the next intervening surface is compared with an expected length L of the tubular segment. When the laser device 216 is at a point in its revolution where the defect 326 protrudes into bore 328 and causes the internal diameter of the tubular segment 310 to be less than the minimum acceptable diameter, laser light reflects off of the defect and is received by the laser device 216. The time-of-flight or pulse measurement reading by the laser device 216 indicates that light traveled a distance smaller than the expected length L of the tubular segment. Thus, it can be determined that the minimum acceptable diameter is not maintained over the full length of the tubular segment 310 and the tubular segment 310 does not pass inspection.

In addition to obtaining pass/fail information from the drifting and measurement process, information about the location of the defect is obtained. The laser device 216 determines how far the emitted light traveled before being reflected; this distance corresponds to the specific location of the defect. The distance may be used to know the exact location of failure such that the failure/defect may be fixed or the point of the defect may be cut by the machine shop. After cutting, rethreading techniques may be employed to make a shorter joint.

Figure 4:
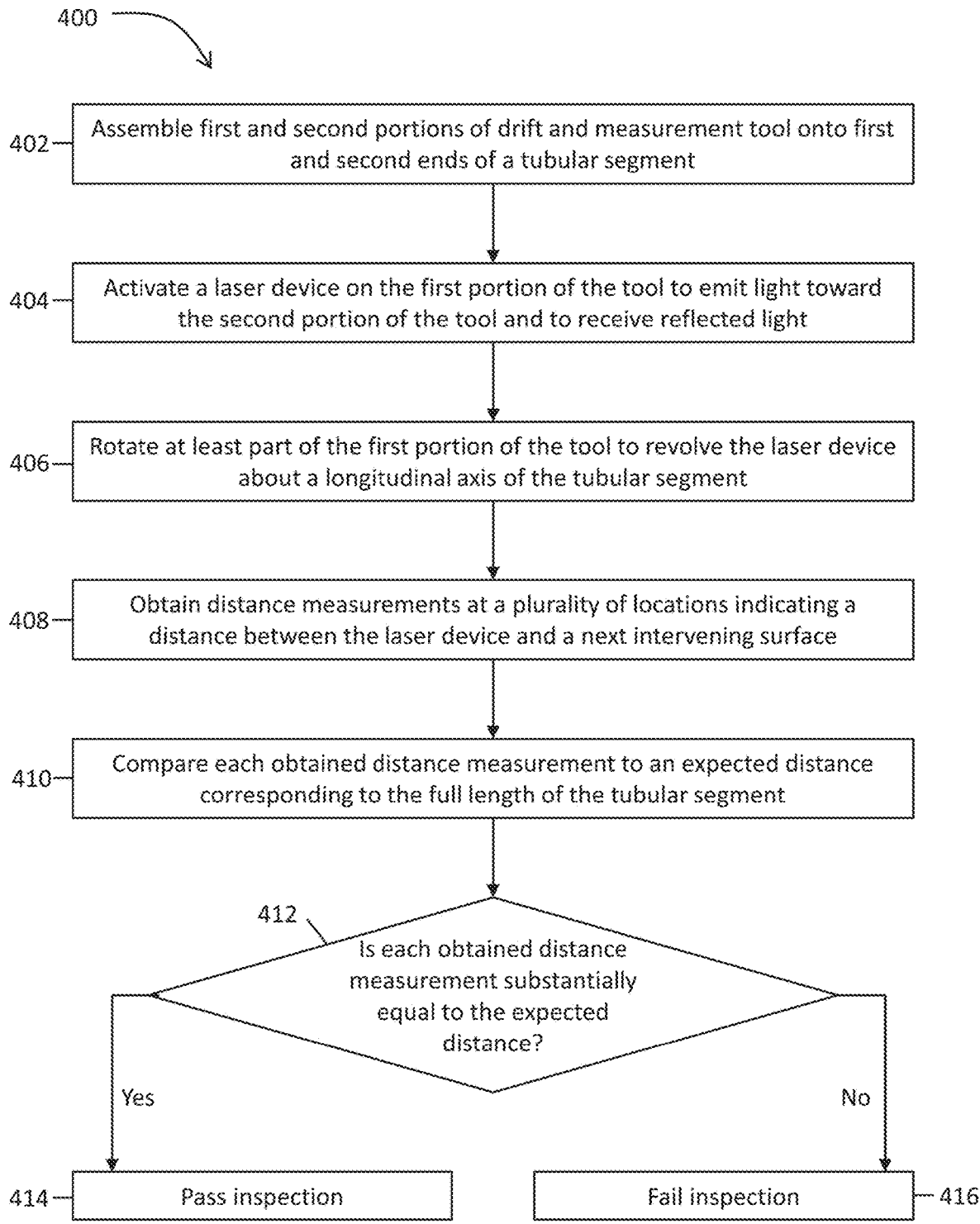
FIG. 4 shows a process flow diagram with steps of a method for operating a drifting and measurement tool, in accordance with embodiments disclosed herein.

FIG. 4 shows a flowchart for a method of a drifting and measurement inspection process 400 carried out with the drifting and measurement tool described above in accordance with embodiments disclosed herein. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

At step 402, the first and second portions of the drift and measurement tool are assembled onto first and second ends of a tubular segment. At step 404, a laser device located on the first portion of the tool is activated to begin emitting light toward the second portion of the tool and to receive reflected light. At step 406, at least part of the first portion of the tool, including the laser device, is revolved about a longitudinal axis of the tubular segment. The laser device may be revolved greater than or equal to 360°. At step 408, distance measurements at a plurality of locations are obtained, where the distance measurements indicate distance between the laser device and a next intervening surface at a plurality of points along the circumferential path of the laser device as it revolves. At step 410, each of the distance measurements is compared to an expected distance that corresponds to the full length of the tubular segment. Decision block 412 asks whether each obtained distance measurement is substantially equal to (i.e., is within a predetermined tolerance of) the expected distance. If the answer to decision block 412 is yes, the tubular segment passes inspection at step 414. If the answer is no, the tubular segment fails inspection at step 416.

Although not shown in FIG. 4, the method may include additional steps. For example, the distance measurements obtained in step 408 may be transmitted to a remote storage module (not shown) and stored there for use with other tubulars/casings. The method may further include disassembling the first and second portions of the drift and measurement tool from the tubular segment once the defect in the tubular/casing is identified or once distance measurements are complete.

Additional configurations of the drifting and measurement tool described herein are possible. For example, the tool may be operated automatically or partially automatically to further reduce time and manpower associated with the drifting and measurement process. Statistical information relating to the number of passed and failed inspections may be collected on a storage module located on the tool or may be transmitted to a remote storage or processing location. In some embodiments, tubular manufacturers may integrate the measurement tool and method into their production line for improved quality control. Furthermore, while the location of laser device 216 is shown in a single location, the laser device 216 may be movable along a radius between the center of the rotatable component and a circumference of the rotatable component to accommodate measuring for different minimum acceptable internal diameters and different size tubulars. Alternatively, the tool 200 may be produced in a plurality of different sizes, each with the laser device 216 positioned at a specific location with respect to the center of the rotatable component 212.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

Although the preceding description has been described herein with reference to particular means, materials and embodiments, it is not intended to be limited to the particulars disclosed herein; rather, it extends to all functionally equivalent structures, methods and uses, such as are within the scope of the appended claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A drifting and measurement tool comprising:
   a first portion configured to mount on a first end of a tubular segment;

a second portion configured to mount on a second end of the tubular segment;

wherein the first portion comprises a rotatable component configured to rotate about a longitudinal axis of the tubular segment, and wherein the rotatable component comprises a laser device configured to emit light toward the second portion and receive reflected light.

2. The drifting and measurement tool of claim 1, wherein the laser device is positioned at a radius relative to the longitudinal axis, and wherein the radius is half of a minimum acceptable internal diameter dimension.

3. The drifting and measurement tool of claim 1, wherein the first portion further comprises a first circumferential wall configured to couple with an outer surface of the tubular segment.

4. The drifting and measurement tool of claim 1, wherein the second portion comprises an end wall configured to reflect laser light toward the laser device.

5. The drifting and measurement tool of claim 4, wherein the second portion further comprises a second circumferential wall configured to couple with the outer surface of the tubular segment.

6. The drifting and measurement tool of claim 4, wherein the end wall is parallel to a plane on which the laser device is configured to travel during rotation about the longitudinal axis.

7. The drifting and measurement tool of claim 1, wherein the rotatable component comprises a handle.

8. The drifting and measurement tool of claim 1, wherein the laser device is configured to emit light continuously.

9. The drifting and measurement tool of claim 1, wherein the laser device is configured to determine a distance between the laser device and an intervening surface.

10. The drifting and measurement tool of claim 9, wherein the laser device is configured to determine the distance between the laser device and the intervening surface based on time-of-flight measurement principles.

11. A method of inspecting a tubular segment, the method comprising:

assembling a first portion of a drift and measurement tool onto a first end of a tubular segment;

assembling a second portion of the drift and measurement tool onto a second end of the tubular segment;

activating a laser device on the first portion, wherein the laser device emits light toward the second portion and wherein the laser device receives reflected light;

rotating at least part of the first portion of the tool to revolve the laser device about a longitudinal axis of the tubular segment; and obtaining distance measurements at a plurality of locations, wherein the distance measurements correspond to a distance between the laser device and an intervening surface.

12. The method of claim 11, wherein revolving the laser device about the longitudinal axis comprises moving the laser device around a circumferential path.

13. The method of claim 12, wherein the circumferential path has a diameter substantially equal to a minimum acceptable internal diameter of the tubular segment.

14. The method of claim 13, further comprising comparing the distance measurements to an expected distance, wherein the expected distance corresponds to the full length of the tubular segment.

15. The method of claim 14, further comprising indicating the tubular segment passes inspection when the distance measurements are substantially equal to the expected distance.

16. The method of claim 14, further comprising indicating the tubular segment fails inspection when at least one of the distance measurements is less than the expected distance.

17. The method of claim 16, further comprising obtaining a location of an obstruction based on the at least one of the distance measurements being less than the expected distance.

18. The method of claim 11, wherein the rotating at least part of the first portion is an automated step.

19. The method of claim 11, further comprising transmitting the distance measurements to a remote storage module.

20. The method of claim 11, further comprising disassembling the first and second portions of the drift and measurement tool from the tubular segment.

* * * * *